(12) United States Patent
Duan et al.

(10) Patent No.: US 12,482,109 B2
(45) Date of Patent: Nov. 25, 2025

(54) COMPLEX INDUSTRIAL IMAGE EDGE EXTRACTION METHOD BASED ON ARTIFICIAL INTELLIGENCE AND COMPLEX INDUSTRIAL IMAGE EDGE EXTRACTION DEVICE THEREOF

(71) Applicant: GOOD VISION PRECISION INSTRUMENT CO., LTD., Dongguan (CN)

(72) Inventors: Cunli Duan, Dongguan (CN); Qihang Zhu, Dongguan (CN)

(73) Assignee: GOOD VISION PRECISION INSTRUMENT CO., LTD., Dongguan (CN)

( * ) Notice: Subject to any disclaimer, the term of this patent is extended or adjusted under 35 U.S.C. 154(b) by 259 days.

(21) Appl. No.: 18/518,522

(22) Filed: Nov. 23, 2023

(65) Prior Publication Data
US 2024/0177322 A1    May 30, 2024

Related U.S. Application Data

(63) Continuation of application No. PCT/CN2023/096433, filed on May 26, 2023.

(30) Foreign Application Priority Data

Nov. 25, 2022    (CN) .......................... 202211487215.1

(51) Int. Cl.
*G06T 7/13* (2017.01)
*G06T 3/40* (2024.01)
(Continued)

(52) U.S. Cl.
CPC ................. *G06T 7/13* (2017.01); *G06T 3/40* (2013.01); *G06T 5/20* (2013.01); *G06V 10/44* (2022.01);
(Continued)

(58) Field of Classification Search
None
See application file for complete search history.

(56) References Cited

U.S. PATENT DOCUMENTS 11,100,352 B2 *  8/2021  Lee ........................... G06T 7/70
2020/0117937 A1 *  4/2020  Lee ......................... G06V 10/82
(Continued)

FOREIGN PATENT DOCUMENTS

CN    113781510 A  * 12/2021  ............. G06N 3/045
CN    117541941 A  *  2/2024  ............. G06V 20/17

*Primary Examiner* — Randolph I Chu
(74) *Attorney, Agent, or Firm* — HOWARD M COHN and Associates, LLC

(57) ABSTRACT

A complex industrial image edge extraction method based on artificial intelligence and a complex industrial image edge extraction device are provided. The complex industrial image edge extraction method based on artificial intelligence includes steps of obtaining first image data to be subjected to edge extraction, and performing image pyramid processing on the first image data to be subjected to the edge extraction to obtain second image data, performing image cropping processing on the second image data to obtain third image data, performing image scaling processing on the third image data to obtain first scaled image data, inputting the first scaled image data into an artificial intelligence model for training and convergence and performing edge extraction processing, and then outputting an edge extraction result of the first scaled image data.

7 Claims, 1 Drawing Sheet

(51) Int. Cl.
    *G06T 5/20*         (2006.01)
    *G06V 10/44*      (2022.01)
    *G06V 10/56*      (2022.01)
    *G06V 10/80*      (2022.01)
    *G06V 20/70*      (2022.01)

(52) U.S. Cl.
    CPC ............ *G06V 10/56* (2022.01); *G06V 10/806* (2022.01); *G06V 20/70* (2022.01); *G06T 2207/20016* (2013.01); *G06T 2207/20132* (2013.01)

(56) References Cited

U.S. PATENT DOCUMENTS

2020/0356718 A1* 11/2020 Chu ..................... H05K 13/081
2021/0056691 A1* 2/2021 Gernand ................ G16H 30/40
2024/0177322 A1* 5/2024 Duan ..................... G06V 10/82

* cited by examiner

COMPLEX INDUSTRIAL IMAGE EDGE EXTRACTION METHOD BASED ON ARTIFICIAL INTELLIGENCE AND COMPLEX INDUSTRIAL IMAGE EDGE EXTRACTION DEVICE THEREOF

TECHNICAL FIELD

The present disclosure relates to a technical field of image processing, and in particular to a complex industrial image edge extraction method based on artificial intelligence and a complex industrial image edge extraction device thereof.

BACKGROUND

Edges are the most basic feature of an image. Image edge detection is always a study key point in a field of image processing, and most of image processing related items, such as dimension measurement based on the image, image classification based on deep learning, target detection based on deep learning, etc., request an accurate extraction for a real edge of an object. With the development of science and technology, industrial products in each field are more and more complex and request higher precision, and in particular, geometric features needing surface illumination are the most require the image edge detection and further need rapid and accurate measurement. Meanwhile, automation and intelligence are also desirable to be achieved in the image edge detection, which is a huge challenge that worldwide vision measurement industry needs to face.

Currently, most of edge extraction algorithms are derived by using a gradient of the image, such as, Canny edge detection algorithm. However, such algorithm has a great disadvantage that a real edge of the image, such as a blurry image, is difficult to truly and effectively detected since an edge contrast of the object is not so obvious.

SUMMARY

The present disclosure aims to overcome defects in the prior art, and provides a complex industrial image edge extraction method based on artificial intelligence and a complex industrial image edge extraction device thereof, so that edges of industrial images being fuzzy and blurry are quickly extracted and the extracted edges may meet industrial requirements.

In order to solve above technical problems, embodiments of the present disclosure provide a complex industrial image edge extraction method based on artificial intelligence, including:
  obtaining first image data to be subjected to edge extraction, and performing image pyramid processing on the first image data to be subjected to the edge extraction to obtain second image data;
  performing image cropping processing on the second image data to obtain third image data;
  performing image scaling processing on the third image data to obtain first scaled image data; and inputting the first scaled image data into an artificial intelligence model for training and convergence and performing edge extraction processing, and then outputting an edge extraction result of the first scaled image data, where the artificial intelligence model for training and convergence sequentially includes convolution mudules, BottleneckCSP network modules/C3 network modules, spatial pyramid pooling-fast (SPPF) modules, up-sampling modules, and Concat modules.

Furthermore, before performing the image pyramid processing on the first image data to be subjected to the edge extraction, the complex industrial image edge extraction method based on artificial intelligence further includes:
  performing smoothing processing on the first image data to be subjected to the edge extraction through 5*5 Gaussian filtering, and then transferring a color space of the first image data to be subjected to the edge extraction into a red, green, and blue (RGB) space.

Furthermore, the performing the image scaling processing on the third image data to obtain the first scaled image data includes:
  performing grayscale conversion processing on the third image data to obtain grayscale image data;
  performing blue, green, and red (BGR) conversion processing on the third image data to obtain BGR image data;
  performing hue, saturation, and value (HSV) conversion processing on the third image data to obtain HSV image data; and
  performing the image scaling processing based on the grayscale image data, the BGR image data, and the HSV image data to obtain the first scaled image data.

Furthermore, a training process of the artificial intelligence model for training and convergence includes:
  obtaining first training image data, performing the image pyramid processing on the first training image data to obtain second training image data;
  performing artificial edge labeling processing based on the second training image data to obtain first labeled training image data;
  performing enhancement processing on the first labeled training image data to obtain second training image data;
  performing the image scaling processing on the second training image data to obtain scaled training image data; and
  inputting the scaled training image data into the artificial intelligence model for training and convergence and performing the training process until the artificial intelligence model for training and convergence is converged.

Furthermore, the performing the enhancement processing on the first labeled training image data to obtain the second training image data includes:
  performing proportional mixing processing on any two images in the first labeled training image data to obtain proportionately mixing and classifying labeled training image data;
  performing the image cropping process on a first region of the first labeled training image data, and filling the first region of the first labeled training image data with a 0 pixel value to obtain first cropped training image data;
  performing the image cropping process on a second region of the first labeled training image data, and filling the second region of the first labeled training image data with a region pixel value of any one image in the first labeled training image data to obtain second cropped training image data; and
  obtaining the second training image data based on the proportionately mixing and classifying labeled training image data, the first cropped training image data, and the second cropped training image data.

Furthermore, the inputting the first scaled image data into the artificial intelligence model for training and convergence and performing the edge extraction processing includes:

inputting the first scaled image data into the artificial intelligence model for training and convergence, and performing feature extraction processing on the artificial intelligence model for training and convergence through the up-sampling modules to obtain a sampling extraction feature image;

inputting the sampling extraction feature image into the BottleneckCSP network modules/C3 network modules and performing the feature extraction processing to obtain an extraction feature, and inputting the extraction feature into the SPPF modules;

copying the extraction feature through the SPPF modules to obtain copy extraction features, connecting the copy extraction features through the Concat modules to obtain connection output feature data;

passing the connection output feature data through a convolution layer having a convolution kernel number of 32 to generate 32*320*320 output feature data, and inputting the 32*320*320 output feature data into a backbone network module through batch normalization (BN) and Leaky Relu;

performing convolution processing in the backbone network model sequentially through a 1*1 convolution layer and a 3*3 convolution layer to obtain a convolution result, and adding the convolution result to the sampling extraction feature image through a residual structure to obtain additive feature data;

adding the additive feature data to an adjacent layer through adaptive feature pooling, and performing Concat operation in the Concat modules to obtain a Concat operation result; and sequentially performing regression loss calculation processing and non-maximum suppression algorithm calculation processing on the Concat result through GOU_Loss to obtain a calculation result, and outputting the calculation result as the edge extraction result of the first scaled image data.

Furthermore, the performing the feature extraction processing on the artificial intelligence model for training and convergence through the up-sampling modules to obtain the sampling extraction feature image includes:

performing a slice operation on the first scaled image data through the up-sampling modules in the artificial intelligence model for training and convergence to obtain second scaled image data, performing the feature extraction processing on the second scaled image data through convolution kernels to obtain a feature extraction result;

performing a convolution operation of 32 convolution kernels on the feature extraction result to obtain a first 320*320*32 feature map; and performing the slice operation on the first 320*320*32 feature map through the up-sampling modules to obtain a second 320*320*32 feature map, performing the feature extraction processing on the second 320*320*32 feature map to obtain a first extraction result, and performing a convolution operation of 64 convolution kernels on the first extraction result to obtain a 160*160*64 feature map.

Furthermore, the inputting the sampling extraction feature image into the BottleneckCSP network modules/C3 network modules and performing the feature extraction processing to obtain the extraction feature, and inputting the extraction feature into the SPPF modules includes:

inputting the sampling extraction feature image into the BottleneckCSP network modules/C3 network modules, and extracting image feature information including structures, colors, edges, and locations through summing;

performing fusion processing on the image feature information including the structures, the colors, the edges, and the locations to obtain a fused image feature information; and performing the feature extraction processing on the fused image feature information based on common convolution kernels to obtain a second extraction result, performing up-sampling processing on the second extraction result to obtain the extraction feature, and inputting the extraction feature into the SPPF modules.

Furthermore, the copying the extraction feature through the SPPF modules to obtain the copy extraction features, connecting the copy extraction features through the Concat modules to obtain the connection output feature data includes:

copying the extraction feature through the SPPF modules to obtain four copy extraction features, and slicing the four copy extraction features into four 3*320*320 feature maps through the slice operation; and connecting the four 3*320*320 feature maps from depths to obtain a 12*320*320 feature map.

In addition, the embodiments of the present disclosure further provide a complex industrial image edge extraction device based on artificial intelligence, including an image pyramid processing module, an image cropping processing module, an image scaling processing module, and an edge feature extraction module. The image pyramid processing module is configured to obtain first image data to be subjected to edge extraction, and perform image pyramid processing on the first image data to be subjected to the edge extraction to obtain second image data. The image cropping processing module is configured to perform image cropping processing on the second image data to obtain third image data. The image scaling processing module is configured to perform image scaling processing on the third image data to obtain first scaled image data. The edge feature extraction module is configured to input the first scaled image data into an artificial intelligence model for training and convergence and performing edge extraction processing, and then output an edge extraction result of the first scaled image data. The artificial intelligence model for training and convergence sequentially includes convolution mudules, BottleneckCSP network modules/C3 network modules, spatial pyramid pooling-fast (SPPF) modules, up-sampling modules, and Concat modules.

According to the embodiments of the present disclosure, the complex industrial image edge extraction method based on artificial intelligence and the complex industrial image edge extraction device thereof are capable of extracting the edges of industrial images being fuzzy and blurry, and the extracted edges may meet industrial requirements.

BRIEF DESCRIPTION OF DRAWINGS

In order to more clearly illustrate embodiments of the present disclosure or technical solutions in the prior art, drawings that need to be used in the embodiments of the present disclosure or the prior art are briefly described below, and it is obvious that the accompanying drawings in the following description are merely some embodiments of the present disclosure, and those who skilled in the art may obtain other drawings according to these drawings without involving any inventive effort.

DETAILED DESCRIPTION OF EMBODIMENTS

Technical solutions in embodiments of the present disclosure are clearly and completely described below with reference to accompanying drawings in the embodiments of the present disclosure. All other embodiments obtained by those who skilled in the art based on the embodiments of the present disclosure without creative efforts shall fall within a protection scope of the present disclosure.

First Embodiment

Figure 1:
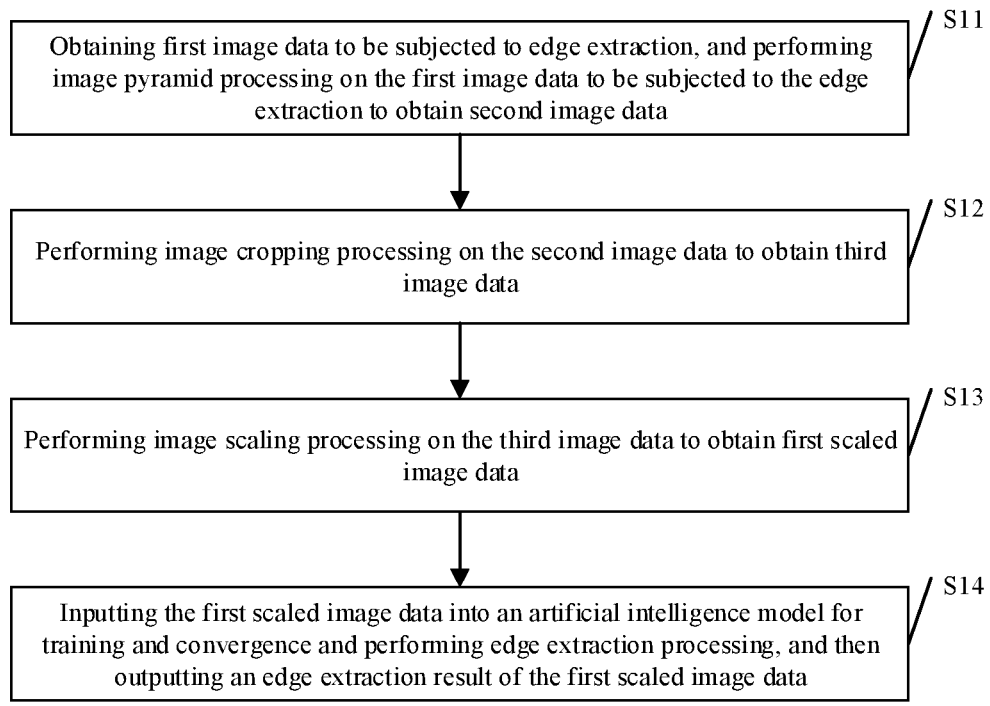
FIG. 1 is a flowchart of a complex industrial image edge extraction method based on artificial intelligence according to one embodiment of the present disclosure.

Please refer to FIG. 1, FIG. 1 is a flowchart of a complex industrial image edge extraction method based on artificial intelligence according to one embodiment of the present disclosure.

As shown in FIG. 1, the complex industrial image edge extraction method based on artificial intelligence is provided, including following steps.

S11: obtaining first image data to be subjected to edge extraction, and performing image pyramid processing on the first image data to be subjected to the edge extraction to obtain second image data.

In a specific implementation process of the present disclosure, before performing the image pyramid processing on the first image data to be subjected to the edge extraction, performing smoothing processing on the first image data to be subjected to the edge extraction through 5*5 Gaussian filtering, and then transferring a color space of the first image data to be subjected to the edge extraction into a red, green, and blue (RGB) space.

Specifically, obtaining the first image data to be subjected to the edge extraction through inputting by users or connecting to an image acquisition device, and after obtaining the first image data to be subjected to the edge extraction, performing the smoothing processing on the first image data to be subjected to the edge extraction through the 5*5 Gaussian filtering, and then transferring the color space of the first image data to be subjected to the edge extraction into the RGB space; therefore, subsequent processing is unified and facilitated, and data processing speed and precision are improved.

After transferring the color space of the first image data to be subjected to the edge extraction into the RGB space, performing the image pyramid processing on the first image data to be subjected to the edge extraction to obtain the second image data. An image pyramid is a collection of images all arising from a single original image that are successively downsampled until some desired stopping point is reached. A bottom of the image pyramid is a high-resolution representation of an image, that is, an original image, and a top of the image pyramid is a low-resolution approximate image; the bottommost layer has the highest resolution and the maximum data volume, and with the increase of the number of layers, the resolution thereof is gradually reduced, and the data volume is also reduced in proportion. There are two methods for constructing the image pyramid; according to a first method, the image pyramid is automatically constructed from a multi-resolution data source; according to a second method, image data at the bottommost layer for constructing the image pyramid are original image, and image data on other layers for constructing the image pyramid are extracted by sampling the image data on the bottommost layer.

S12: performing image cropping processing on the second image data to obtain third image data.

In a specific implementation process of the present disclosure, in the performing the image cropping processing on the second image data to obtain the third image data, first performing positioning processing on a target in the second image data to obtain a positioning position, and performing the image cropping processing on the second image data according to the positioning position to remove unnecessary areas of the second image, which facilitates improvement of subsequent processing speed and obtains the third image data.

S13: performing image scaling processing on the third image data to obtain first scaled image data.

In a specific implementation process of the present disclosure, the performing the image scaling processing on the third image data to obtain the first scaled image data includes performing grayscale conversion processing on the third image data to obtain grayscale image data, performing blue, green, and red (BGR) conversion processing on the third image data to obtain BGR image data, performing hue, saturation, and value (HSV) conversion processing on the third image data to obtain HSV image data, and performing the image scaling processing based on the grayscale image data, the BGR image data, and the HSV image data to obtain the first scaled image data.

Specifically, performing the grayscale conversion processing on the third image data to obtain the grayscale image data, performing the BGR conversion processing on the third image data to obtain the BGR image data, performing the HSV conversion processing on the third image data to obtain the HSV image data, and performing the image scaling processing according to the grayscale image data, the BGR image data, and the HSV image data, then finally obtaining the first scaled image data.

S14: inputting the first scaled image data into an artificial intelligence model for training and convergence and performing edge extraction processing, and then outputting an edge extraction result of the first scaled image data, where the artificial intelligence model for training and convergence sequentially includes convolution mudules, BottleneckCSP network modules/C3 network modules, spatial pyramid pooling-fast (SPPF) modules, up-sampling modules, and Concat modules.

In a specific implementation process of the present disclosure, a training process of the artificial intelligence model for training and convergence includes obtaining first training image data, performing the image pyramid processing on the first training image data to obtain second training image data, performing artificial edge labeling processing based on the second training image data to obtain first labeled training image data, performing enhancement processing on the first labeled training image data to obtain second training image data, performing the image scaling processing on the second training image data to obtain scaled training image data, inputting the scaled training image data into the artificial intelligence model for training and convergence and performing the training process until the artificial intelligence model for training and convergence is converged.

Furthermore, the performing the enhancement processing on the first labeled training image data to obtain the second training image data includes performing proportional mixing processing on any two images in the first labeled training image data to obtain proportionately mixing and classifying labeled training image data, performing the image cropping process on a first region of the first labeled training image data, and filling the first region of the first labeled training image data with a 0 pixel value to obtain first cropped training image data, performing the image cropping process on a second region of the first labeled training image data, and filling the second region of the first labeled training image data with a region pixel value of any one image in the first labeled training image data to obtain second cropped training image data, and obtaining the second training image data based on the proportionately mixing and classifying labeled training image data, the first cropped training image data, and the second cropped training image data.

Furthermore, the inputting the first scaled image data into the artificial intelligence model for training and convergence and performing the edge extraction processing includes inputting the first scaled image data into the artificial intelligence model for training and convergence, and performing feature extraction processing on the artificial intelligence model for training and convergence through the up-sampling modules to obtain a sampling extraction feature image, inputting the sampling extraction feature image into the BottleneckCSP network modules/C3 network modules and performing the feature extraction processing to obtain an extraction feature, and inputting the extraction feature into the SPPF modules, copying the extraction feature through the SPPF modules to obtain copy extraction features, connecting the copy extraction features through the Concat modules to obtain connection output feature data, passing the connection output feature data through a convolution layer having a convolution kernel number of 32 to generate 32*320*320 output feature data, and inputting the 32*320*320 output feature data into a backbone network module through batch normalization (BN) and Leaky Relu, performing convolution processing in the backbone network model sequentially through a 1*1 convolution layer and a 3*3 convolution layer to obtain a convolution result, and adding the convolution result to the sampling extraction feature image through a residual structure to obtain additive feature data, adding the additive feature data to an adjacent layer through adaptive feature pooling, and performing Concat operation in the Concat modules to obtain a Concat operation result, and sequentially performing regression loss calculation processing and non-maximum suppression algorithm calculation processing on the Concat result through GOU_Loss to obtain a calculation result, and outputting the calculation result as the edge extraction result of the first scaled image data.

Furthermore, the performing the feature extraction processing on the artificial intelligence model for training and convergence through the up-sampling modules to obtain the sampling extraction feature image includes performing a slice operation on the first scaled image data through the up-sampling modules in the artificial intelligence model for training and convergence to obtain second scaled image data, performing the feature extraction processing on the second scaled image data through convolution kernels to obtain a feature extraction result, performing a convolution operation of 32 convolution kernels on the feature extraction result to obtain a first 320*320*32 feature map, and performing the slice operation on the first 320*320*32 feature map through the up-sampling modules to obtain a second 320*320*32 feature map, performing the feature extraction processing on the second 320*320*32 feature map to obtain a first extraction result, and performing a convolution operation of 64 convolution kernels on the first extraction result to obtain a 160*160*64 feature map.

Furthermore, the inputting the sampling extraction feature image into the BottleneckCSP network modules/C3 network modules and performing the feature extraction processing to obtain the extraction feature, and inputting the extraction feature into the SPPF modules includes inputting the sampling extraction feature image into the BottleneckCSP network modules/C3 network modules, and extracting image feature information including structures, colors, edges, and locations through summing, performing fusion processing on the image feature information including the structures, the colors, the edges, and the locations to obtain a fused image feature information, and performing the feature extraction processing on the fused image feature information based on common convolution kernels to obtain a second extraction result, performing up-sampling processing on the second extraction result to obtain the extraction feature, and inputting the extraction feature into the SPPF modules.

Furthermore, the copying the extraction feature through the SPPF modules to obtain the copy extraction features, connecting the copy extraction features through the Concat modules to obtain the connection output feature data includes copying the extraction feature through the SPPF modules to obtain four copy extraction features, and slicing the four copy extraction features into four 3*320*320 feature maps through the slice operation, and connecting the four 3*320*320 feature maps from depths to obtain a 12*320*320 feature map.

Specifically, the artificial intelligence model for training and convergence is first trained, and the training process of the artificial intelligence model for training and convergence is as follows, The first training image data are first obtained, and the smoothing processing is performed on the first training image data through the 5*5 Gaussian filtering, then a color space of the first training image data is transferred into the RGB space, and the image pyramid processing is performed on the first training image data to obtain second training image data. In order to facilitate training, the artificial edge labeling processing is performed based on the second training image data to facilitate identification during training, so as to obtain the first labeled training image data. In order to reduce the first training image data and avoid a problem of overfitting during training, the enhancement processing is performed on the first labeled training image data to obtain second training image data, the image scaling processing is performed on the second training image data to obtain scaled training image data, the scaled training image data are input into the artificial intelligence model for training and convergence and the training process is performed until the artificial intelligence model for training and convergence is converged. If the artificial intelligence model for training and convergence is not converged after the training process, parameters of each layer node in the artificial intelligence model for training and convergence are modified according to deviation values through a back propagation function, and then the artificial intelligence model for training and convergence is re-trained.

When performing the enhancement processing on the first labeled training image, the proportional mixing processing is performed on any two images in the first labeled training image data to obtain the proportionately mixing and classifying labeled training image data, the image cropping process is performed on the first region of the first labeled training image data, and the first region of the first labeled training image data is filled with the 0 pixel value to obtain the first cropped training image data, meanwhile, the image cropping process is performed on the second region of the first labeled training image data, and the second region of the first labeled training image data is filled with the region pixel value of any one image in the first labeled training image data to obtain the second cropped training image data, and the second training image data are obtained based on the proportionately mixing and classifying labeled training image data, the first cropped training image data, and the second cropped training image data.

Meanwhile, the artificial intelligence model for training and convergence sequentially includes the convolution mudules, the BottleneckCSP network modules/C3 network modules, the SPPF modules, the up-sampling modules, and the Concat modules.

When inputting the first scaled image data into the artificial intelligence model for training and convergence and performing the edge extraction processing, the first scaled image data are first input into the artificial intelligence model for training and convergence, and the feature extraction processing is performed on the artificial intelligence model for training and convergence through the up-sampling modules to obtain the sampling extraction feature image, then the sampling extraction feature image is input into the BottleneckCSP network modules/C3 network modules and the feature extraction processing is performed to obtain the extraction feature, and the extraction feature is input into the SPPF modules, the extraction feature is copied through the SPPF modules to obtain the copy extraction features, the copy extraction features are connected through the Concat modules to obtain the connection output feature data, the connection output feature data pass through the convolution layer having the convolution kernel number of 32 to generate the 32*320*320 output feature data, and the 32*320*320 output feature data are input into the backbone network module through the BN and the Leaky Relu, the convolution processing is performed in the backbone network model sequentially through the 1*1 convolution layer and the 3*3 convolution layer to obtain the convolution result, and adding the convolution result to the sampling extraction feature image through the residual structure to obtain the additive feature data, the additive feature data are added to the adjacent layer through the adaptive feature pooling, and the Concat operation is performed in the Concat modules to obtain the Concat operation result, the regression loss calculation processing and the non-maximum suppression algorithm calculation processing are sequentially performed on the Concat result through the GOU_Loss to obtain the calculation result, and the calculation result is output as the edge extraction result of the first scaled image data.

When performing the feature extraction processing on the artificial intelligence model for training and convergence through the up-sampling modules, the slice operation is performed on the first scaled image data through the up-sampling modules in the artificial intelligence model for training and convergence to obtain the second scaled image data, the feature extraction processing is performed on the second scaled image data through the convolution kernels to obtain the feature extraction result, then the convolution operation of 32 convolution kernels is performed on the feature extraction result to obtain the first 320*320*32 feature map, the slice operation is performed on the first 320*320*32 feature map through the up-sampling modules to obtain the second 320*320*32 feature map, the feature extraction processing is performed on the second 320*320*32 feature map to obtain the first extraction result, and the convolution operation of 64 convolution kernels is performed on the first extraction result to obtain the 160*160*64 feature map.

When inputting the sampling extraction feature image into the BottleneckCSP network modules/C3 network modules and performing the feature extraction processing, the sampling extraction feature image is first input into the BottleneckCSP network modules/C3 network modules, and the image feature information including the structures, the colors, the edges, and the locations is extracted through summing, the fusion processing is performed on the image feature information including the structures, the colors, the edges, and the locations to obtain the fused image feature information, the feature extraction processing is performed on the fused image feature information based on the common convolution kernels to obtain the second extraction result, the up-sampling processing is performed on the second extraction result to obtain the extraction feature, and the extraction feature is input into the SPPF modules.

When copying the extraction feature through the SPPF modules to obtain the copy extraction features and connecting the copy extraction features through the Concat modules to obtain the connection output feature data, the extraction feature is copied through the SPPF modules to obtain the four copy extraction features, and slicing the four copy extraction features into the four 3*320*320 feature maps through the slice operation, connecting the four 3*320*320 feature maps from the depths to obtain the 12*320*320 feature map.

According to the embodiments of the present disclosure, the complex industrial image edge extraction method based on artificial intelligence is capable of extracting edges of industrial images being fuzzy and blurry, and the extracted edges may meet industrial requirements.

Second Embodiment

Figure 2:
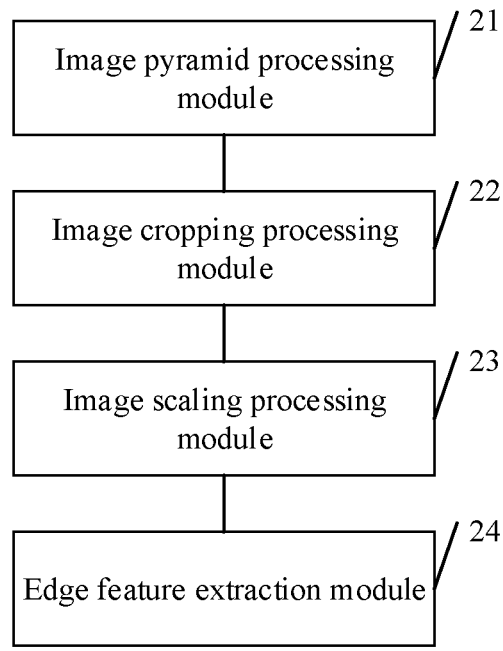
FIG. 2 is a structural schematic diagram of a complex industrial image edge extraction device based on artificial intelligence according to one embodiment of the present disclosure.

Please refer to FIG. 2, FIG. 2 is a structural schematic diagram of a complex industrial image edge extraction device based on artificial intelligence according to one embodiment of the present disclosure.

As shown in FIG. 2, the present disclosure further provides a complex industrial image edge extraction device based on artificial intelligence, including an image pyramid processing module 21, the image pyramid processing module 21 is configured to obtain first image data to be subjected to edge extraction, and perform image pyramid processing on the first image data to be subjected to the edge extraction to obtain second image data.

In a specific implementation process of the present disclosure, before the image pyramid processing is performed on the first image data to be subjected to the edge extraction, smoothing processing is performed on the first image data to be subjected to the edge extraction through 5*5 Gaussian filtering, and then a color space of the first image data to be subjected to the edge extraction is transferred into an RGB space.

Specifically, the first image data to be subjected to the edge extraction is obtained through inputting by users or connecting to an image acquisition device, and after the first image data to be subjected to the edge extraction is obtained, the smoothing processing is performed on the first image data to be subjected to the edge extraction through the 5*5 Gaussian filtering, and then the color space of the first image data to be subjected to the edge extraction is transferred into the RGB space; therefore, subsequent processing is unified and facilitated, and data processing speed and precision are improved.

After transferring the color space of the first image data to be subjected to the edge extraction into the RGB space, the image pyramid processing is performed on the first image data to be subjected to the edge extraction to obtain the second image data. An image pyramid is a collection of images all arising from a single original image that are successively downsampled until some desired stopping point is reached. A bottom of the image pyramid is a high-resolution representation of an image, that is, an original image, and a top of the image pyramid is a low-resolution approximate image; the bottommost layer has the highest resolution and the maximum data volume, and with the increase of the number of layers, the resolution thereof is gradually reduced, and the data volume is also reduced in proportion. There are two methods for constructing the image pyramid; according to a first method, the image pyramid is automatically constructed from a multi-resolution data source; according to a second method, image data at the bottommost layer for constructing the image pyramid are original image, and image data on other layers for constructing the image pyramid are extracted by sampling the image data on the bottommost layer.

The complex industrial image edge extraction device based on artificial intelligence further includes an image cropping processing module 22 configured to perform image cropping processing on the second image data to obtain third image data.

In a specific implementation process of the present disclosure, the image cropping processing is performed on the second image data to obtain the third image data, positioning processing is first performed on a target in the second image data to obtain a positioning position, and the image cropping processing is performed on the second image data according to the positioning position to remove unnecessary areas of the second image, which facilitates improvement of subsequent processing speed and obtains the third image data.

The complex industrial image edge extraction device based on artificial intelligence further includes an image scaling processing module 23 configured to perform image scaling processing on the third image data to obtain first scaled image data.

In a specific implementation process of the present disclosure, the image scaling processing is performed on the third image data to obtain the first scaled image data, grayscale conversion processing is performed on the third image data to obtain grayscale image data, BGR conversion processing is performed on the third image data to obtain BGR image data, HSV conversion processing is performed on the third image data to obtain HSV image data, and the image scaling processing is performed based on the grayscale image data, the BGR image data, and the HSV image data to obtain the first scaled image data.

Specifically, the grayscale conversion processing is performed on the third image data to obtain the grayscale image data, the BGR conversion processing is performed on the third image data to obtain the BGR image data, the HSV conversion processing is performed on the third image data to obtain the HSV image data, and the image scaling processing is performed according to the grayscale image data, the BGR image data, and the HSV image data, then the first scaled image data are finally obtained, The complex industrial image edge extraction device based on artificial intelligence further includes an edge feature extraction module 24 configured to input the first scaled image data into an artificial intelligence model for training and convergence and performing edge extraction processing, and then output an edge extraction result of the first scaled image data. The artificial intelligence model for training and convergence sequentially includes convolution mudules, BottleneckCSP network modules/C3 network modules, spatial pyramid pooling-fast (SPPF) modules, up-sampling modules, and Concat modules.

In a specific implementation process of the present disclosure, in a training process of the artificial intelligence model for training and convergence, training image data are first obtained, the image pyramid processing is performed on the first training image data to obtain second training image data, artificial edge labeling processing is performed based on the second training image data to obtain first labeled training image data, enhancement processing is performed on the first labeled training image data to obtain second training image data, the image scaling processing is performed on the second training image data to obtain scaled training image data, the scaled training image data are input into the artificial intelligence model for training and convergence and the training process is performed until the artificial intelligence model for training and convergence is converged.

Furthermore, the enhancement processing is performed on the first labeled training image data to obtain the second training image data, in which proportional mixing processing is performed on any two images in the first labeled training image data to obtain proportionately mixing and classifying labeled training image data, the image cropping process is performed on a first region of the first labeled training image data, and the first region of the first labeled training image data is filled with a 0 pixel value to obtain first cropped training image data, the image cropping process is performed on a second region of the first labeled training image data, and the second region of the first labeled training image data is filled with a region pixel value of any one image in the first labeled training image data to obtain second cropped training image data, and the second training image data are obtained based on the proportionately mixing and classifying labeled training image data, the first cropped training image data, and the second cropped training image data.

Furthermore, the first scaled image data are input into the artificial intelligence model for training and convergence and the edge extraction processing is performed, in which the first scaled image data are input into the artificial intelligence model for training and convergence, and feature extraction processing is performed on the artificial intelligence model for training and convergence through the up-sampling modules to obtain a sampling extraction feature image, the sampling extraction feature image is input into the BottleneckCSP network modules/C3 network modules and the feature extraction processing is performed to obtain an extraction feature, and the extraction feature is input into the SPPF modules, the extraction feature is copied through the SPPF modules to obtain copy extraction features, the copy extraction features are connected through the Concat modules to obtain connection output feature data, the connection output feature data pass through a convolution layer having a convolution kernel number of 32 to generate 32*320*320 output feature data, and the 32*320*320 output feature data are input into a backbone network module through batch normalization (BN) and Leaky Relu, convolution processing is performed in the backbone network model sequentially through a 1*1 convolution layer and a 3*3 convolution layer to obtain a convolution result, and the convolution result is added to the sampling extraction feature image through a residual structure to obtain additive feature data, the additive feature data is added to an adjacent layer through adaptive feature pooling, and Concat operation is performed in the Concat modules to obtain a Concat operation result, and regression loss calculation processing and non-maximum suppression algorithm calculation processing are sequentially performed on the Concat result through GOU_Loss to obtain a calculation result, and the calculation result is output as the edge extraction result of the first scaled image data.

Furthermore, the feature extraction processing is performed on the artificial intelligence model for training and convergence through the up-sampling modules to obtain the sampling extraction feature image, in which a slice operation is performed on the first scaled image data through the up-sampling modules in the artificial intelligence model for training and convergence to obtain second scaled image data, the feature extraction processing is performed on the second scaled image data through convolution kernels to obtain a feature extraction result, a convolution operation of 32 convolution kernels is performed on the feature extraction result to obtain a first 320*320*32 feature map, and the slice operation is performed on the first 320*320*32 feature map through the up-sampling modules to obtain a second 320*320*32 feature map, the feature extraction processing is performed on the second 320*320*32 feature map to obtain a first extraction result, and a convolution operation of 64 convolution kernels is performed on the first extraction result to obtain a 160*160*64 feature map.

Furthermore, the sampling extraction feature image is input into the BottleneckCSP network modules/C3 network modules and the feature extraction processing is performed to obtain the extraction feature, and the extraction feature in input into the SPPF modules, in which the sampling extraction feature image is input into the BottleneckCSP network modules/C3 network modules, and image feature information including structures, colors, edges, and locations is extracted through summing, fusion processing is performed on the image feature information including the structures, the colors, the edges, and the locations to obtain a fused image feature information, and the feature extraction processing is performed on the fused image feature information based on common convolution kernels to obtain a second extraction result, up-sampling processing is performed on the second extraction result to obtain the extraction feature, and the extraction feature is input into the SPPF modules.

Furthermore, the extraction feature is copied through the SPPF modules to obtain the copy extraction features, and the copy extraction features are connected through the Concat modules to obtain the connection output feature data, in which the extraction feature is copied through the SPPF modules to obtain four copy extraction features, and the four copy extraction features are sliced into four 3*320*320 feature maps through the slice operation, and the four 3*320*320 feature maps are connected from depths to obtain a 12*320*320 feature map.

Specifically, the artificial intelligence model for training and convergence is first trained, and the training process of the artificial intelligence model for training and convergence is as follows, The first training image data is first obtained, and the smoothing processing is performed on the first training image data through the 5*5 Gaussian filtering, then a color space of the first training image data is transferred into the RGB space, and the image pyramid processing is performed on the first training image data to obtain second training image data. In order to facilitate training, the artificial edge labeling processing is performed based on the second training image data to facilitate identification during training, so as to obtain the first labeled training image data. In order to reduce the first training image data and avoid a problem of overfitting during training, the enhancement processing is performed on the first labeled training image data to obtain second training image data, the image scaling processing is performed on the second training image data to obtain scaled training image data, the scaled training image data is input into the artificial intelligence model for training and convergence and the training process is performed until the artificial intelligence model for training and convergence is converged. If the artificial intelligence model for training and convergence is not converged after the training process, parameters of each layer node in the artificial intelligence model for training and convergence are modified according to deviation values through a back propagation function, and then the artificial intelligence model for training and convergence is re-trained.

When performing the enhancement processing on the first labeled training image, the proportional mixing processing is performed on any two images in the first labeled training image data to obtain the proportionately mixing and classifying labeled training image data, the image cropping process is performed on the first region of the first labeled training image data, and the first region of the first labeled training image data is filled with the 0 pixel value to obtain the first cropped training image data, meanwhile, the image cropping process is performed on the second region of the first labeled training image data, and the second region of the first labeled training image data is filled with the region pixel value of any one image in the first labeled training image data to obtain the second cropped training image data, and the second training image data is obtained based on the proportionately mixing and classifying labeled training image data, the first cropped training image data, and the second cropped training image data.

Meanwhile, the artificial intelligence model for training and convergence sequentially includes the convolution mudules, the BottleneckCSP network modules/C3 network modules, the SPPF modules, the up-sampling modules, and the Concat modules.

When inputting the first scaled image data into the artificial intelligence model for training and convergence and performing the edge extraction processing, the first scaled image data is first input into the artificial intelligence model for training and convergence, and the feature extraction processing is performed on the artificial intelligence model for training and convergence through the up-sampling modules to obtain the sampling extraction feature image, then the sampling extraction feature image is input into the BottleneckCSP network modules/C3 network modules and the feature extraction processing is performed to obtain the extraction feature, and the extraction feature is input into the SPPF modules, the extraction feature is copied through the SPPF modules to obtain the copy extraction features, the copy extraction features are connected through the Concat modules to obtain the connection output feature data, the connection output feature data pass through the convolution layer having the convolution kernel number of 32 to generate the 32*320*320 output feature data, and the 32*320*320 output feature data are input into the backbone network module through the BN and the Leaky Relu, the convolution processing is performed in the backbone network model sequentially through the 1*1 convolution layer and the 3*3 convolution layer to obtain the convolution result, and adding the convolution result to the sampling extraction feature image through the residual structure to obtain the additive feature data, the additive feature data is added to the adjacent layer through the adaptive feature pooling, and the Concat operation is performed in the Concat modules to obtain the Concat operation result, the regression loss calculation processing and the non-maximum suppression algorithm calculation processing are sequentially performed on the Concat result through the GOU_Loss to obtain the calculation result, and the calculation result is output as the edge extraction result of the first scaled image data.

When performing the feature extraction processing on the artificial intelligence model for training and convergence through the up-sampling modules, the slice operation is performed on the first scaled image data through the up-sampling modules in the artificial intelligence model for training and convergence to obtain the second scaled image data, the feature extraction processing is performed on the second scaled image data through the convolution kernels to obtain the feature extraction result, then the convolution operation of 32 convolution kernels is performed on the feature extraction result to obtain the first 320*320*32 feature map, the slice operation is performed on the first 320*320*32 feature map through the up-sampling modules to obtain the second 320*320*32 feature map, the feature extraction processing is performed on the second 320*320*32 feature map to obtain the first extraction result, and the convolution operation of 64 convolution kernels is performed on the first extraction result to obtain the 160*160*64 feature map.

When inputting the sampling extraction feature image into the BottleneckCSP network modules/C3 network modules and performing the feature extraction processing, the sampling extraction feature image is first input into the BottleneckCSP network modules/C3 network modules, and the image feature information including the structures, the colors, the edges, and the locations is extracted through summing, the fusion processing is performed on the image feature information including the structures, the colors, the edges, and the locations to obtain the fused image feature information, the feature extraction processing is performed on the fused image feature information based on the common convolution kernels to obtain the second extraction result, the up-sampling processing is performed on the second extraction result to obtain the extraction feature, and the extraction feature is input into the SPPF modules.

When copying the extraction feature through the SPPF modules to obtain the copy extraction features and connecting the copy extraction features through the Concat modules to obtain the connection output feature data, the extraction feature is copied through the SPPF modules to obtain the four copy extraction features, and slicing the four copy extraction features into the four 3*320*320 feature maps through the slice operation, connecting the four 3*320*320 feature maps from the depths to obtain the 12*320*320 feature map.

According to the embodiments of the present disclosure, the complex industrial image edge extraction device based on artificial intelligence is capable of extracting edges of industrial images being fuzzy and blurry, and the extracted edges may meet industrial requirements.

Those who skilled in the art may understand that all or some of the steps in the various methods of the above embodiments may be completed by a program instructing related hardware, the program may be stored in a computer-readable storage medium, and the computer-readable storage medium may include a read-only memory (ROM), a random access memory (RAM), a magnetic disk, an optical disc, etc.

In addition, the above embodiments of the present disclosure provide a complex industrial image edge extraction method based on artificial intelligence and a complex industrial image edge extraction method thereof, which are described in detail herein, and the foregoing description of the embodiments is merely used to help understand the method of the present disclosure and a core idea thereof. Meanwhile, for those who skilled in the art, according to the idea of the present disclosure, the content of the present specification may be changed in specific embodiments and application ranges. In summary, the content of the present specification should not be construed as a limitation to the present disclosure.

What is claimed is:

1. A complex industrial image edge extraction method based on artificial intelligence, comprising:

obtaining first image data to be subjected to edge extraction, and performing image pyramid processing on the first image data to be subjected to the edge extraction to obtain second image data;

performing image cropping processing on the second image data to obtain third image data;

performing image scaling processing on the third image data to obtain first scaled image data; and inputting the first scaled image data into an artificial intelligence model for training and convergence and performing edge extraction processing, and then outputting an edge extraction result of the first scaled image data;

wherein the artificial intelligence model for training and convergence sequentially comprises convolution mudules, BottleneckCSP network modules/C3 network modules, spatial pyramid pooling-fast (SPPF) modules, up-sampling modules, and Concat modules;

wherein the inputting the first scaled image data into the artificial intelligence model for training and convergence and performing the edge extraction processing comprises:

inputting the first scaled image data into the artificial intelligence model for training and convergence, and performing feature extraction processing on the artificial intelligence model for training and convergence through the up-sampling modules to obtain a sampling extraction feature image;

inputting the sampling extraction feature image into the BottleneckCSP network modules/C3 network modules and performing the feature extraction processing to obtain an extraction feature, and inputting the extraction feature into the SPPF modules;

copying the extraction feature through the SPPF modules to obtain copy extraction features, connecting the copy extraction features through the Concat modules to obtain connection output feature data;

passing the connection output feature data through a convolution layer having a convolution kernel number of 32 to generate 32*320*320 output feature data, and inputting the 32*320*320 output feature data into a backbone network module through batch normalization (BN) and Leaky Relu;

performing convolution processing in the backbone network model sequentially through a 1*1 convolution layer and a 3*3 convolution layer to obtain a convolution result, and adding the convolution result to the sampling extraction feature image through a residual structure to obtain additive feature data;

adding the additive feature data to an adjacent layer through adaptive feature pooling, and performing Concat operation in the Concat modules to obtain a Concat operation result; and sequentially performing regression loss calculation processing and non-maximum suppression algorithm calculation processing on the Concat result through GOU_Loss to obtain a calculation result, and outputting the calculation result as the edge extraction result of the first scaled image data;

wherein the performing the feature extraction processing on the artificial intelligence model for training and convergence through the up-sampling modules to obtain the sampling extraction feature image comprises:

performing a slice operation on the first scaled image data through the up-sampling modules in the artificial intelligence model for training and convergence to obtain second scaled image data, performing the feature extraction processing on the second scaled image data through convolution kernels to obtain a feature extraction result;

performing a convolution operation of 32 convolution kernels on the feature extraction result to obtain a first 320*320*32 feature map; and performing the slice operation on the first 320*320*32 feature map through the up-sampling modules to obtain a second 320*320*32 feature map, performing the feature extraction processing on the second 320*320*32 feature map to obtain a first extraction result, and performing a convolution operation of 64 convolution kernels on the first extraction result to obtain a 160*160*64 feature map;

wherein the inputting the sampling extraction feature image into the BottleneckCSP network modules/C3 network modules and performing the feature extraction processing to obtain the extraction feature, and inputting the extraction feature into the SPPF modules comprises:

inputting the sampling extraction feature image into the BottleneckCSP network modules/C3 network modules, and extracting image feature information including structures, colors, edges, and locations through summing;

performing fusion processing on the image feature information including the structures, the colors, the edges, and the locations to obtain a fused image feature information; and performing the feature extraction processing on the fused image feature information based on common convolution kernels to obtain a second extraction result, performing up-sampling processing on the second extraction result to obtain the extraction feature, and inputting the extraction feature into the SPPF modules.

2. The complex industrial image edge extraction method based on artificial intelligence according to claim 1, wherein before performing the image pyramid processing on the first image data to be subjected to the edge extraction, the complex industrial image edge extraction method based on artificial intelligence further comprises:

performing smoothing processing on the first image data to be subjected to the edge extraction through 5*5 Gaussian filtering, and then transferring a color space of the first image data to be subjected to the edge extraction into a red, green, and blue (RGB) space.

3. The complex industrial image edge extraction method based on artificial intelligence according to claim 1, wherein the performing the image scaling processing on the third image data to obtain the first scaled image data comprises:

performing grayscale conversion processing on the third image data to obtain grayscale image data;

performing blue, green, and red (BGR) conversion processing on the third image data to obtain BGR image data;

performing hue, saturation, and value (HSV) conversion processing on the third image data to obtain HSV image data; and performing the image scaling processing based on the grayscale image data, the BGR image data, and the HSV image data to obtain the first scaled image data.

4. The complex industrial image edge extraction method based on artificial intelligence according to claim 1, wherein a training process of the artificial intelligence model for training and convergence comprises:

obtaining first training image data, performing the image pyramid processing on the first training image data to obtain second training image data;

performing artificial edge labeling processing based on the second training image data to obtain first labeled training image data;

performing enhancement processing on the first labeled training image data to obtain second training image data;

performing the image scaling processing on the second training image data to obtain scaled training image data; and inputting the scaled training image data into the artificial intelligence model for training and convergence and performing the training process until the artificial intelligence model for training and convergence is converged.

5. The complex industrial image edge extraction method based on artificial intelligence according to claim 4, wherein the performing the enhancement processing on the first labeled training image data to obtain the second training image data comprises:

performing proportional mixing processing on any two images in the first labeled training image data to obtain proportionately mixing and classifying labeled training image data;

performing the image cropping process on a first region of the first labeled training image data, and filling the first region of the first labeled training image data with a 0 pixel value to obtain first cropped training image data;

performing the image cropping process on a second region of the first labeled training image data, and filling the second region of the first labeled training image data with a region pixel value of any one image in the first labeled training image data to obtain second cropped training image data; and obtaining the second training image data based on the proportionately mixing and classifying labeled training image data, the first cropped training image data, and the second cropped training image data.

6. The complex industrial image edge extraction method based on artificial intelligence according to claim 1, wherein the copying the extraction feature through the SPPF modules to obtain the copy extraction features, connecting the copy extraction features through the Concat modules to obtain the connection output feature data comprises:

copying the extraction feature through the SPPF modules to obtain four copy extraction features, and slicing the four copy extraction features into four 3*320*320 feature maps through the slice operation; and
connecting the four 3*320*320 feature maps from depths to obtain a 12*320*320 feature map.

7. A complex industrial image edge extraction device based on artificial intelligence, comprising:
an image pyramid processing module;
an image cropping processing module;
an image scaling processing module; and
an edge feature extraction module;
wherein the image pyramid processing module is configured to obtain first image data to be subjected to edge extraction, and perform image pyramid processing on the first image data to be subjected to the edge extraction to obtain second image data; the image cropping processing module is configured to perform image cropping processing on the second image data to obtain third image data; the image scaling processing module is configured to perform image scaling processing on the third image data to obtain first scaled image data; and the edge feature extraction module is configured to input the first scaled image data into an artificial intelligence model for training and convergence and performing edge extraction processing, and then output an edge extraction result of the first scaled image data;
wherein the artificial intelligence model for training and convergence sequentially comprises convolution mudules, BottleneckCSP network modules/C3 network modules, spatial pyramid pooling-fast (SPPF) modules, up-sampling modules, and Concat modules;
wherein the edge feature extraction module is configured to input the first scaled image data into the artificial intelligence model for training and convergence and performing the edge extraction processing, the first scaled image data are input into the artificial intelligence model for training and convergence, and the feature extraction processing is performed on the artificial intelligence model for training and convergence through the up-sampling modules to obtain the sampling extraction feature image; the sampling extraction feature image is input into the BottleneckCSP network modules/C3 network modules and the feature extraction processing is performed to obtain an extraction feature, then the extraction feature is input into the SPPF modules; the extraction feature is copied through the SPPF modules to obtain copy extraction features, the copy extraction features are copied through the Concat modules to obtain connection output feature data; the connection output feature data pass through a convolution layer having a convolution kernel number of 32 to generate 32*320*320 output feature data, and the 32*320*320 output feature data are input into a backbone network module through batch normalization (BN) and Leaky Relu; convolution processing is performed in the backbone network model sequentially through a 1*1 convolution layer and a 3*3 convolution layer to obtain a convolution result, and the convolution result is added to the sampling extraction feature image through a residual structure to obtain additive feature data; the additive feature data are added to an adjacent layer through adaptive feature pooling, and Concat operation is performed in the Concat modules to obtain a Concat operation result; regression loss calculation processing and non-maximum suppression algorithm calculation processing are sequentially performed on the Concat result through GOU_Loss to obtain a calculation result, and the calculation result is output as the edge extraction result of the first scaled image data;
wherein the feature extraction processing is performed on the artificial intelligence model for training and convergence through the up-sampling modules to obtain the sampling extraction feature image, a slice operation is performed on the first scaled image data through the up-sampling modules in the artificial intelligence model for training and convergence to obtain second scaled image data, the feature extraction processing is performed on the second scaled image data through convolution kernels to obtain a feature extraction result; the slice operation is performed on the first 320*320*32 feature map through the up-sampling modules to obtain a second 320*320*32 feature map, the feature extraction processing is performed on the second 320*320*32 feature map to obtain a first extraction result, and a convolution operation of 64 convolution kernels is performed on the first extraction result to obtain a 160*160*64 feature map;
wherein the sampling extraction feature image is input into the BottleneckCSP network modules/C3 network modules and the feature extraction processing is performed to obtain the extraction feature, and the extraction feature is input into the SPPF modules; the sampling extraction feature image is input into the BottleneckCSP network modules/C3 network modules, and image feature information including structures, colors, edges, and locations is extracted through summing; fusion processing is performed on the image feature information including the structures, the colors, the edges, and the locations to obtain a fused image feature information; and the feature extraction processing is performed on the fused image feature information based on common convolution kernels to obtain a second extraction result, up-sampling processing is performed on the second extraction result to obtain the extraction feature, and the extraction feature is input into the SPPF modules.

* * * * *